(12) United States Patent
Anwar

(10) Patent No.: US 6,490,577 B1
(45) Date of Patent: Dec. 3, 2002

(54) SEARCH ENGINE WITH USER ACTIVITY MEMORY

(75) Inventor: Mohammed S. Anwar, Houston, TX (US)

(73) Assignee: PolyVista, Inc., Houston, TX (US)

( * ) Notice: Subject to any disclaimer, the term of this patent is extended or adjusted under 35 U.S.C. 154(b) by 0 days.

(21) Appl. No.: 09/541,457

(22) Filed: Mar. 31, 2000

Related U.S. Application Data

(60) Provisional application No. 60/127,441, filed on Apr. 1, 1999.

(51) Int. Cl.[7] .................................................. G06F 17/30
(52) U.S. Cl. ............................................................. 707/3
(58) Field of Search ...................... 707/4, 3, 10; 705/10; 709/224

(56) References Cited

U.S. PATENT DOCUMENTS

| | | | |
|---|---|---|---|
| 5,796,952 A | * 8/1998 | Davis et al. | 709/224 |
| 5,864,845 A | 1/1999 | Voorhees et al. | 707/5 |
| 5,864,846 A | 1/1999 | Voorhees et al. | 707/5 |
| 5,864,863 A | 1/1999 | Burrows | 707/103 |
| 5,870,740 A | 2/1999 | Rose et al. | 707/5 |
| 5,873,076 A | 2/1999 | Barr et al. | 707/3 |
| 5,890,152 A | 3/1999 | Rapaport et al. | 707/6 |
| 6,029,195 A | * 2/2000 | Herz | 707/10 |
| 6,208,975 B1 | * 3/2001 | Bull et al. | 705/10 |
| 6,363,377 B1 | * 3/2002 | Kravets et al. | 707/4 |

* cited by examiner

Primary Examiner—Cam Linh T. Nguyen
(74) Attorney, Agent, or Firm—Robert W. Strozier

(57) ABSTRACT

A search engine is disclosed that utilizes both record based data and user activity data to develop, update and refine ranking protocols and to identify words and phrases that give rise to search ambiguity so that the engine can interact with the user to better respond to user queries and enhance data acquisition from databases, intranets and internets.

10 Claims, 15 Drawing Sheets

SEARCH ENGINE WITH USER ACTIVITY MEMORY

RELATED APPLICATION

This application claims priority to U.S. Provisional Application Ser. No. 60/127,441 filed Apr. 1, 1999, incorporated herein by reference.

BACKGROUND OF THE INVENTION

1. Field of the Invention

The present invention relates to a search engine that captures and stores user activity data and uses the stored data to refine search rankings and to methods implemented on a computer for capturing, storing and analyzing user activity data and refining rankings in subsequent searches.

More particularly, the present invention relates to a search engine that after displaying search results captures and stores user activity data. The user activity data is then analyzed and used to refine ranking in search results in subsequent searches where the ranking protocol will include user activity data, record based data and relationships derived therefrom. The accumulated user activity data can be used to improve search results, improve search efficiency and improve list rankings so better service the user.

2. Description of the Related Art

Search engines are well-established in the industry. The search engines provide users with a procedure for finding data in a database. Unfortunately, the current search engines use a ranking for displaying records that meet a particular query in whole or in part which is derived from the data in the record that meet the query criteria. Thus, if a record includes many references to a given search term, it may be placed higher on the list which the user must scroll through. There simply is no user derived data other than the search query to aid in ranking records. Thus, there is a need in the art for a search engine that incorporates into its ranking criteria the user activity data.

ABBREVIATIONS AND DEFINITIONS

The following words and/or abbreviations which may appear throughout this disclosure will have the meaning set forth below:

URL means universal record location.

UAD means user activity data.

RSD means record specific data.

RP means ranking protocol.

DB means database.

URLDB means universal record location database.

DPU means a digital processing unit.

CPU means a central processing unit.

Token means a character string (keyword), punctuation and operators.

Keyword means a unique character string which appears in a database entry.

Operator means any Boolean operator for connecting keywords.

Query means a collection of keywords, punctuation and operators that represents a request for data from a user.

SUMMARY OF THE INVENTION

Devices and Software Implemented in a DPU

The present invention provides a search engine component implemented in a DPU including a packet processing module that converts each packet of as search to at least one transaction and processes each transaction. The engine component also includes a database including records, keywords, user activity data, and a user activity data updating routine for updating user activity data. The engine component also includes a ranking protocol constructed from record specific data and user activity data for ranking retrieved records from the records database.

The present invention also provides a search engine component including a packet processing module that converts each packet of a search or query into at least one transaction and processes the transaction. The engine components also includes a database module that includes at least one records database that may include user activity data. The database module includes a keywords database including user activity data and a user activity data updating routine for updating user activity data. The engine component also includes a ranking protocol constructed from record specific data and user activity data for ranking retrieved records from the records database.

The present invention also provides a search engine component including a packet processing module that converts each packet of a search or query into at least one transaction and processes the transaction. The engine components also includes a database module that includes at least one records database, where the database module includes a keywords database; a user activity data database, and a user activity data updating routine for updating user activity data. The engine components also includes a ranking protocol constructed from record specific data and user activity data for ranking retrieved records from the records database.

The present invention provides a search engine component including a packet processing module that converts each packet to at least one transaction and a ranking protocol including record specific data and user activity data for ranking retrieved records from a records database. The search engine component also includes a database module including at least one records database, a keyword database, a user activity data database, and a user activity data database updating routine for updating the user activity data database. The search engine component also includes a transaction processing module for processing transactions. The transaction processing module includes a new query processing routine for retrieving records satisfying the query and ranking the retrieved records according to the ranking protocol; a selected record processing routine including a first user activity data activity value and a count incrementer; a record range processing routine including a second user activity data activity value and the count incrementer for identifying retrieved records viewed by a user; a terminal activity processing routine including a third user activity data activity value and the count incrementer.

The search engine components of this invention can further include a query refinement module for identifying clustering of records based on user activity data and RSD so that user queries can have improved relevance and context.

The search engine components can be combined with other search engine components such as a user interface, RSD processing routines, communication and I/O routines, and like to produce complete search engines of the present invention.

The present invention provides a database module including at least one database including records, keywords, user activity data, and a user activity data updating routine for updating user activity data.

The present invention includes a ranking protocol including RSD and user activity data for ranking retrieved records from the records database.

Methods and Processes

The present invention also provides a method implemented in a search engine of the present invention stored in a DPU for capturing UAD involving receiving a user response, processing the user response, computing response UAD according to an user activity protocol if the response is not a new query, and updating UAD in appropriate databases in the engine.

The present invention also provides a method implemented in a search engine of the present invention stored in a DPU for preprocessing a user query involving receiving a new query, determining query ambiguities, presenting to the user ambiguity resolving selections, and processing a user selected ambiguity resolving selection.

The present invention also provides a method implemented in a search engine of the present invention stored in a DPU for updating a ranking protocol involving updating UAD based terms in the protocol.

The present invention provides a method implemented in a search engine of the present invention stored in a DPU for searching involving receiving a user response and processing the user response. If the response is a new query, then records satisfying the query are assembled into a list. The assembled list is then ranked according to a ranking protocol comprising RSD and UAD terms and the ranked list is presented to the user. If the response is not a new query response or a termination response, then response UAD are computed according to a user activity protocol and corresponding UAD are updated in appropriate databases. The updated UAD is then used to refine the ranking protocol. The method is continued until the user session is completed. The method may also include the query preprocessing method described above.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
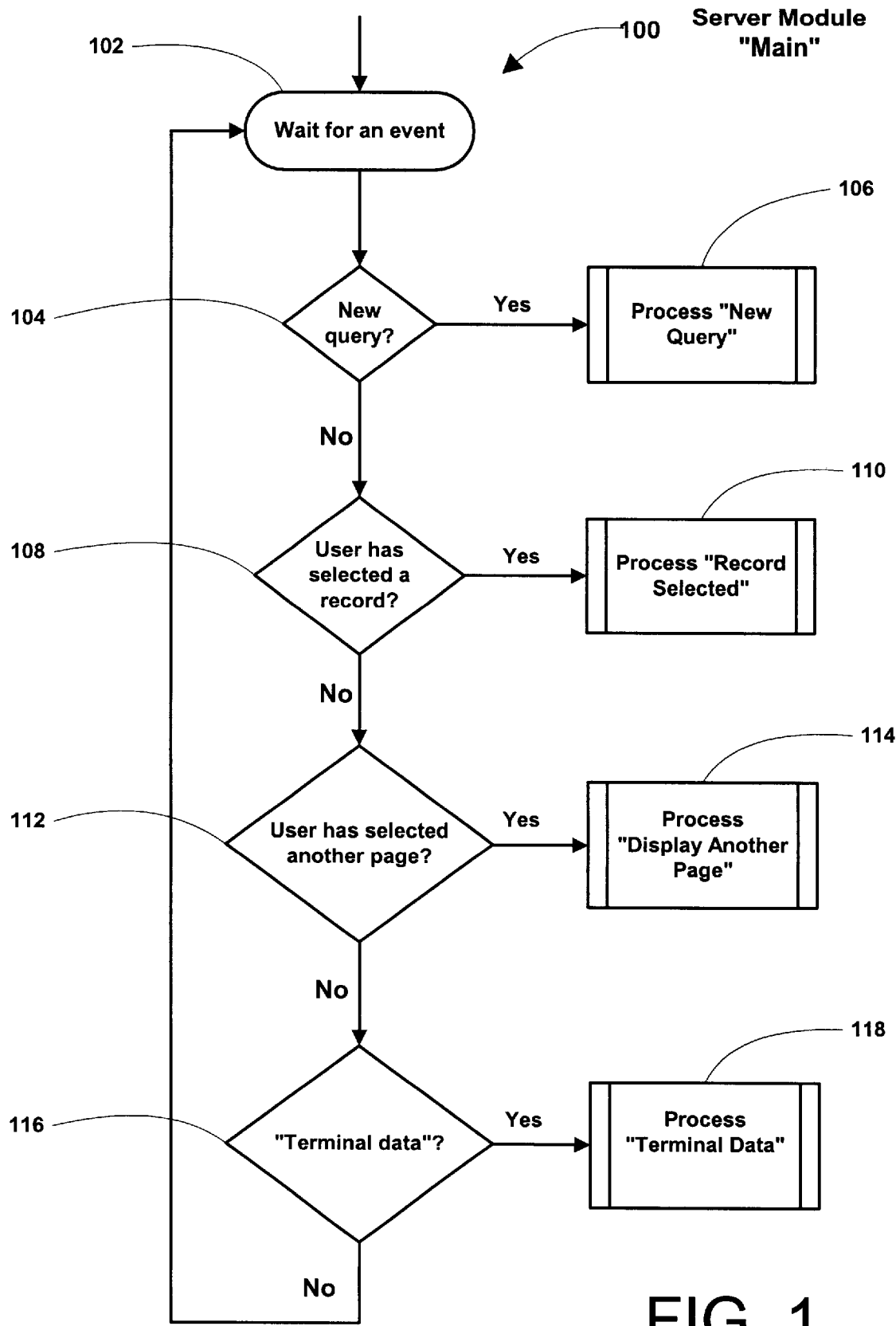
FIG. 1 is a block diagram of a main module of a search engine of the present invention.

The inventor has found that a superior ranking protocol for database search hit list display organization can be constructed by incorporating user activity data. UAD includes at least selection activity data, but can also include time spent at selected record, record specific activity data and hypertext link activity data. UAD can either be directly used to augment the ranking protocol sequentially or UAD data can be accumulated in a database and used to continually refine ranking data. General—useful—1. more intelligent and discriminating in hits selection and display—2 becomes context sensitive for the purpose to query refinement (e.g. Beatles insect v. music; "Houston Rockets" basketball v. space)—3 prior art AI in engine modified by a module coupling user activity data a dynamic AI routine for aiding users to efficiency and effectively find applicable data related to therein query.

Search Engines in General

The term "search engine" is often used generically to describe both true search engines and directories. They are not the same. Additional details about search engines are described in U.S. Pat. Nos.: 5,890,152, 5,873,076, 5,870,740, 5,864,863, 5,864,846, 5,864,845, 5,819,255, and 5,802,524, incorporated herein by reference. The difference is how listings are compiled.

Search Engines:

Search engines, such as HotBot, create their listings automatically. Search engines crawl the web, then people search through what they have found. If you change your web pages, search engines eventually find these changes, and that can affect how you are listed. Page titles, body copy and other elements all play a role.

Directories:

A directory such as Yahoo depends on humans for its listings. You submit a short description to the directory for your entire site, or editors write one for sites they review. A search looks for matches only in the descriptions submitted. Changing your web pages has no effect on your listing. Things that are useful for improving a listing with a search engine have nothing to do with improving a listing in a directory. The only exception is that a good site, with good content, might be more likely to get reviewed than a poor site.

Hybrid Search Engines:

Some search engines maintain an associated directory. Being included in a search engine's directory is usually a combination of luck and quality. Sometimes you can "submit" your site for review, but there is no guarantee that it will be included. Reviewers often keep an eye on sites submitted to announcement places, then choose to add those that look appealing.

Search Engines of the Present Invention

Broadly, the present invention relates to a search engine or search engine add-on which after query capture, list acquisition, ranking and displaying, monitors, captures and saves user activity data involving the displayed list. The UAD can involve terminal activity (printing, e-mailing, bookmarking, copying/cutting/pasting, etc., temporal data associated with a listed record selection, and/or activity in a records after selection monitored by some type of an agent. For intranets and internets, the search engines of the present invention can use agents to monitor user activity once the user has jumped to a given site or URL. Each activity will have an associated value so that the UAD value and count can be updated for each record involved in a user activity. It should be recognized that the UAD is user independent and is accumulated upon any query activity involving the engine. Moreover, the engine could be designed to be user specific by including a user tag in each database entry, but this is not preferred because the database would become large rapidly. However, for user limited sites, such user specific UAD profiles may be extremely valuable.

The search engines of the present invention also allow the engine query processing and listing ranking routines to learn as UAD is accumulated. Thus, the engine can learn better and more effective ways to response to a user query. Because most user queries are simple single word query, vast amount of data is likely to be retrieved, while the user may be interested only in a narrow subset of records that contain the single keyword. UAD can be used to break vast amount of data into focused classes or clusters of data. This classification can then be presented to the user prior to record retrieval to improve context and relevancy of the data eventually presented to the user. Additionally, the engine can learn to better rank retrieved records without going to the user. The ranking protocol withe usage can continually or periodically evolve over time.

Search engine incorporating the UAD in its ranking protocols which can be toggled on or off without effecting the capturing of UAD for refining record UAD value and count.

The present invention can further include routines for disabling UAD updating of keywords with "stable" ranking profile (i.e., the profile is not changing significantly with count) and to disable UAD updating for particular users and to disable UAD periodically or completely.

The UAD data can then be used to construct a new ranking protocol which evolves as additional UAD data is captured, stored and analyzed. Thus, if a traditional ranking protocols relies solely on record specific data (RSD), then new ranking protocols of the present invention will comprise RSD and UAD to better service the user.

UAD Storage

The UAD data can be stored in a number of different locations so that the ranking protocol can be continuously updated and refined to better navigate user through a database. The UAD is preferably stored in the keyword indexed database and/or database table as a UAD value and count associated with each entry where each entry comprises a keyword keyed to a record in the record database, i.e., there is at least one entry for every keyword that appears in every record, but each entry is unique (a given keyword pointing to a given record). Each time a given keyword appears in a query and a given record is acted upon by the user, the UAD value and count associated with the entry corresponding to that keyword and record are updated by simple adding the current value and count with the query generated value and count.

Alternatively and additionally, the UAD data can be stored in each record as a UAD weight and count. Thus, each time a user selects a given record, the activity generated UAD value is added to the current record UAD value and the record UAD count is incremented; again, the generated value and count can be an integer or a real number.

Preferably, the UAD is stored in both the keyword database and the record database so that the engine will have keyword UAD as well and record UAD which can be used for query preprocessing and records database classifications.

UAD Protocols—Value Assigments

If the user query contains one or more terms and one or more operators, then the database can use any well-known process for updating UAD based on the relationship between the keywords and operators. The preferred method involves updating UAD equally for all keyword in an "AND" association in a user query, updating UAD individually for keywords in an "OR" association in a user query, (i.e., if keyword exists in record, then update; otherwise do not update) and updating UAD for all other queries which are combinations of keywords and boolean operators, as a decomposition in terms of "AND" and/or "OR" operations and/or additions or subtractions of lists generated by the "AND" and/or "OR" operations as is well known in the art.

One preferred process for a assigning query specific UAD value uses the following numerical assignments for each user activity:

| | |
|---|---|
| selected | +1 |
| viewed and not selected | −1 |
| not view and not selected | 0 |
| immediate return (return within j seconds) | −2 |
| short time return (return between j seconds and k seconds) | +1 |
| long time return (return between k seconds and 1 seconds) | +2 |
| infinite time return (greater than 1 seconds) | 0 |
| printing a page list | +0.2 |
| bookmarking | +3 |
| e-mailing | +0.3 |
| copy/cut/paste | +0.2 | where j, k and l are counting or real numbers. Preferred values for j, k and l are: j about 30 seconds; k between about 30 seconds and about 180 seconds; l between about 180 seconds and about 1800 seconds, and greater than 1800 seconds the user is out to lunch. Thus, the UAD value associated with each keyword database entry can be updated by adding a query generated value to the current UAD value. The UAD counter is simply the number of times a user activity has involved the record. Although linear incrementation is preferred, the counter can be fractionally incremented with the fractional amount dependent on the type of user activity involved. Of course, any assignment protocol can be used as long as it discriminates based on user activity.

Query Ambiguities and Query Preprocessing

The present invention can also include query preprocessing routines that can be Al routines that analyze queries for ambiguities to partially alleviate data overload and to improve context and relevance of retrieved records. When a query is received, the routines will analyze the keywords that make up the query. Each keyword can appear n number of times in the keyword database, one entry for each appearance in a record. Each entry will have a UAD value and count. If the top ten entries having the highest values and/or counts can be selected, then the preprocessing routines jumps to the records and determine record-based contextual data by analyzing additional keyword frequencies or the like or the routine can find the UAD values and counts for each additional keyword that appears in the record and sorts the additional record keywords with respect to their weights and/or counts. The routine then causing the top m secondary or additional keywords to be presented to the user so that the scope of search can be modified to better suit the user.

Alternatively, the preprocessing routine can analyze all of the retrieved keyword entries by retrieving all or a selected number of additional keywords in each retrieved record and applying a similarity classification protocol to cluster the records contextually, e.g., sports, entertainment, parks, roads, building, industries, housing, etc. and present the classification to the user.

As UAD is accumulated and saved in the databases, where UAD include the queries as wells as all activity associated with query processing and hit displaying, the search engine or administrators of the search engine and analyze the UAD for the purpose of learning user selection patterns. These information can be used to better construct database, to better index data, to better perform house keeping functions, to stream line search strategies, to archive data of little or no relevance (not selected often) to reduce resource requirements or for any other purpose to which such information can be put.

Ranking Protocol Refinement

The search engines of the present invention also relates to methods for updating the ranking protocol used to rank records returned from the records database either continuously or periodically based on UAD. Additionally, the search engines of the present invention can present to user ranked data using different ranking protocols so that the routines can learn or construct preferred ranking protocols. Of course, if the search engine is using a particular form of a ranking protocol, the routine can learn directly from the accumulated UAD weights and counts.

Ranking Protocols

The present invention also relates to a ranking protocol including record specific data and user activity data. One embodiment of a ranking protocol is given by Formula (1):

$$r = \sum_i \alpha_i w_i^{pi} + \sum_{i,i'} \beta_{i,i'} \cdot (w_i \cdot w_{i'}) + \sum_j \alpha_j w_j^{pj} + \sum_{j,j'} \beta_{j,j'} \cdot (w_j \cdot w_{j'}) + \sum_{i,j} \gamma_{i,j} \cdot (w_i \cdot w_j) \quad (1)$$

where r is a ranking factor, $\alpha_i$ is a weight factor representing an amount of weight to be given to $w_i$ which is a value of an $i^{th}$ record specific criterion, $p_i$ is a power factor of the $i^{th}$ record specific criterion and i is an integer ranging over the record specific criteria; where $\alpha_j$ is a weight factor representing an amount of weight to be given to $w_j$ which is a value of an $j^{th}$ user activity criterion, $p_j$ is a power factor of the $j^{th}$ user activity criterion and j is an integer ranging over the user activity criteria and where $\beta_{i,i'}$ is a weight factor for a product $w_i$ time $w_{i'}$, $\beta_{j,j'}$ is a weight factor for a product $w_j$ time $w_{j'}$, and $\gamma_{ij}$ is a weight factor for a cross-product $w_i$ times $w_j$.

Of course, it should be obvious to one of ordinary skill in the art that higher order products and cross-products can be included as well. It should be recognized that the $w_i$'s and $w_j$'s will vary over time. The $w_i$'s vary as new records are added while the $w_j$'s vary with UAD accumulation.

One preferred ranking protocol of Formula (1) is given by Formula (2):

$$r = \sum_i \alpha_i w_i^{pi} + \sum_j \alpha_j w_j^{pj} \quad (2)$$

where r, $\alpha_i$, $w_i$, $p_i$, i, $\alpha_j$, $w_j$, $p_j$ and j are as previously defined.

Another preferred ranking protocol of Formula (1) is given by Formula (3):

$$r = \sum_i \alpha_i w_i^{pi} + \sum_j \alpha_j w_j \quad (3)$$

where r, $\alpha_i$, $w_i$, $p_i$, i, $\alpha_j$, $w_j$, and j are as previously defined.

Another preferred ranking protocol of Formula (1) is given by Formula (4):

$$r = \sum_i \alpha_i w_i + \sum_j \alpha_j w_j^{pj} \quad (4)$$

where r, $\alpha_i$, $w_i$, i, $\alpha_j$, $w_j$, $p_j$ and j are as previously defined.

Another preferred ranking protocol of Formula (1) is given by Formula (5):

$$r = \sum_i \alpha_i w_i + \sum_j \alpha_j w_j \quad (5)$$

where r, $\alpha_i$, $w_i$, i, $\alpha_j$, $w_j$, and j are as previously defined.

Another preferred ranking protocol of Formula (1) is given by Formula (6):

$$r = \left( \sum_i \alpha_i w_i^{pi} \right) + \beta \times \left( \sum_j w_j^{pj} \right) \quad (6)$$

where r, $\alpha_i$, $w_i$, $P_i$, i, $w_j$, $p_j$ and j are as previously defined and $\beta$ is a weight factor for the entire indicated sum. Another preferred ranking protocol of Formula (1) is given by Formula (7):

$$r = \beta \times \left( \sum_i w_i^{pi} \right) + \left( \sum_j \alpha_j w_j^{pj} \right) \quad (7)$$

where r, $w_i$, $p_i$, i, $\alpha_j$, $w_j$, j, $\alpha$ and $\beta$ are as previously defined.

Another preferred ranking protocol of Formula (1) is given by Formula (8):

$$r = \alpha \times \left( \sum_i w_i \right) + \beta \times \left( \sum_j w_j \right) \quad (8)$$

where r, $w_i$, i, $w_j$, $p_j$, j, $\alpha$ and $\beta$ are as previously defined. $\alpha$ and $\beta$ have values that range between 0.0 and 1.0 and their sum is 1.0 so that the rank r will represent either a pure UAD ranking, a pure record selection ranking or a mixed ranking with a different blend of record selection data and UAD.

Of course, ranking protocols can be generated that represent mixtures and combination of the rankings of formulas described above.

UAD criteria include, without limitation, e-mailing, printing, bookmarking, marking, copying/cutting/pasting, selecting coupled with duration of selection, viewing, but not selected, or the like.

RSD criteria include, without limitation, word frequency, word location, word proximity for multiple keyword queries, and all other record or site specific criterion identified in the US Patents cited and incorporated by reference herein and any other record or site specific data.

Detailed Description of Conceptual Flowcharts

Referring now to FIG. 1, a flowchart generally 100 is a server module called "Main", which describes the basic steps for a program implemented in a digital processing unit for the purpose of receiving a packet that is sent to the search engine server for processing. This is an event driven module, 102 waits for an event to happen, i.e. a packet to show up in the queue, before this module is executed. The arrival of a new packet will create an event that will trigger this module. The first step in the execution is 104 where the module tries to determine, if the incoming packet is a "new query" or not. "New query" mean that the user has supplied one or more keywords and/or one or more Boolean operators, and the user wants to search for records that contain these keywords. If the determination is true, then the program proceeds along a YES branch to 106, which is a call to an external module to process a new query. If the determination is false, then the routine proceeds along a NO branch to 108. 108 is a step in which the module tries to determine if the incoming packet is "the user has selected a record" or not. This means the user has selected a record from the displayed list, and the user wants to view this record. Thus, this data needs to be logged in the database. If the determination is true, then the program proceeds along a YES branch to 110 which is a call to an external module to process the fact that the user has selected a record. If the determination is false, then the routine proceeds along a NO branch to 112. 112 is a step in which the module tries to determine if the incoming packet is the "user has requested another page" or not. This means the user wants to see a different set of records. If the determination is true, then the program proceeds along a YES branch to 114 which is a call to an external module to process the fact that the user has requested another page. If the determination is false, then the routine proceeds along a NO branch to 116. 116 is a step in which the module tries to determine if the incoming packet is reporting the user terminal activity data or not. This means this packet contains the data on the actions the user had performed on the client interface, i.e. print, bookmark, etc. If the determination is true, then the program proceeds along a YES branch to 118 which is a call to an external module to process the "terminal data". If the determination is false, then the routine proceeds along Page 15 a NO branch back to 102, where the module will either wait or process the next packet in the queue.

Figure 2:
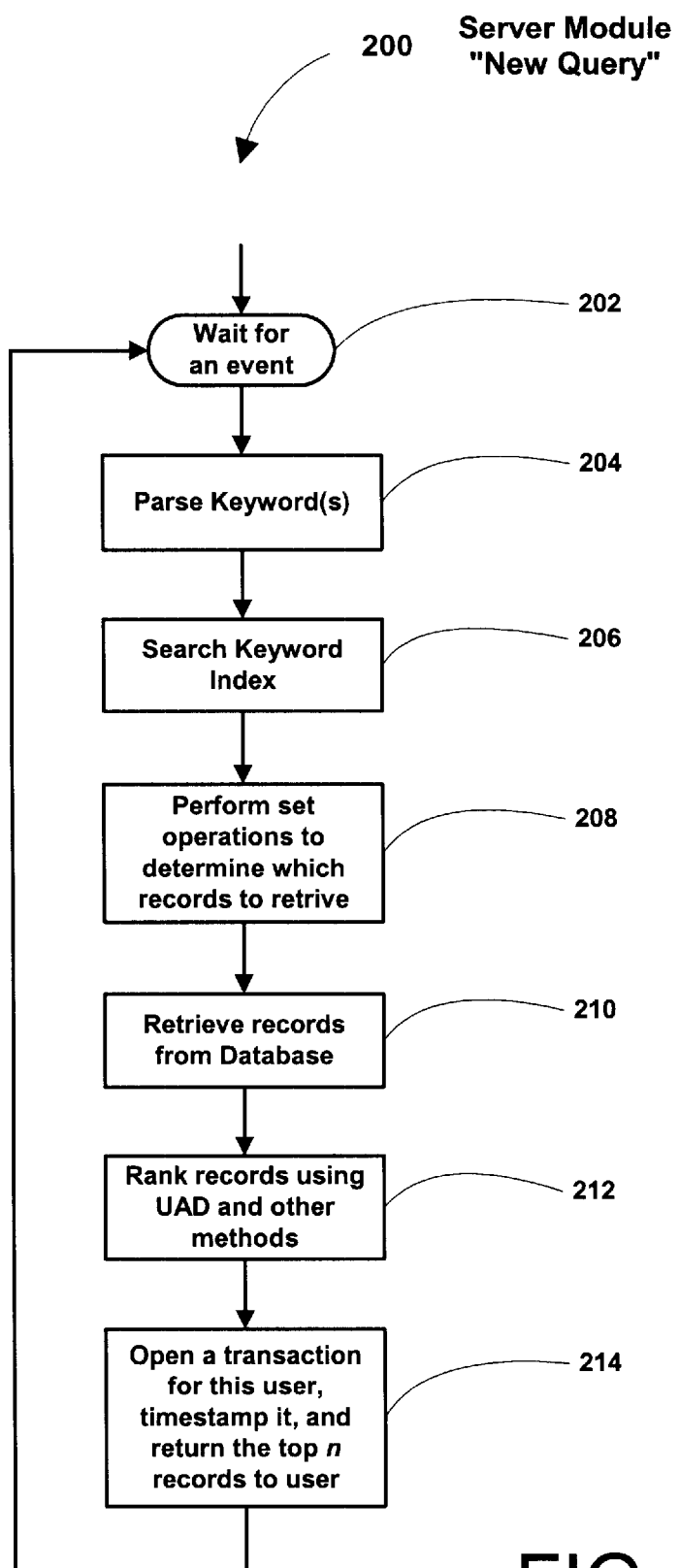
FIG. 2 is a block diagram of a new query module of a search engine of the present invention.

Referring now to FIG. 2, a flowchart generally 200 is a server module called "New Query", which describes the basic steps for a program implemented in a digital processing unit for the purpose of processing a search request that is sent to the search engine. This is an event driven module, 202 waits for an event to happen, i.e. a packet to show up in the queue, before this module is executed. The arrival of a new packet will create an event that will trigger this module. The first step in the execution is 204 where the module will parse the keyword(s) and the Boolean operators (if any). Once the keyword(s) have been parsed, the next step 206 is to search the keyword index for the existence of the search keyword(s) so that the records that contain the keyword(s) can be determined. Step 208 will apply set theory operations on the keyword links to determine the records that have to be retrieved. Once it has been determined which records have to be retrieved, step 210 will issue a query to retrieve those records from the records database. Before the retrieved records can be sent 175 to the user, the records have to be ranked, step 212 will rank the retrieved records based on UAD and other ranking protocols. Step 214 will open a new transaction for this user, the transaction will be timestamped, user address and the keyword(s) will be saved. Then the first set of records—a page—will be sent to the user.

Figure 3:
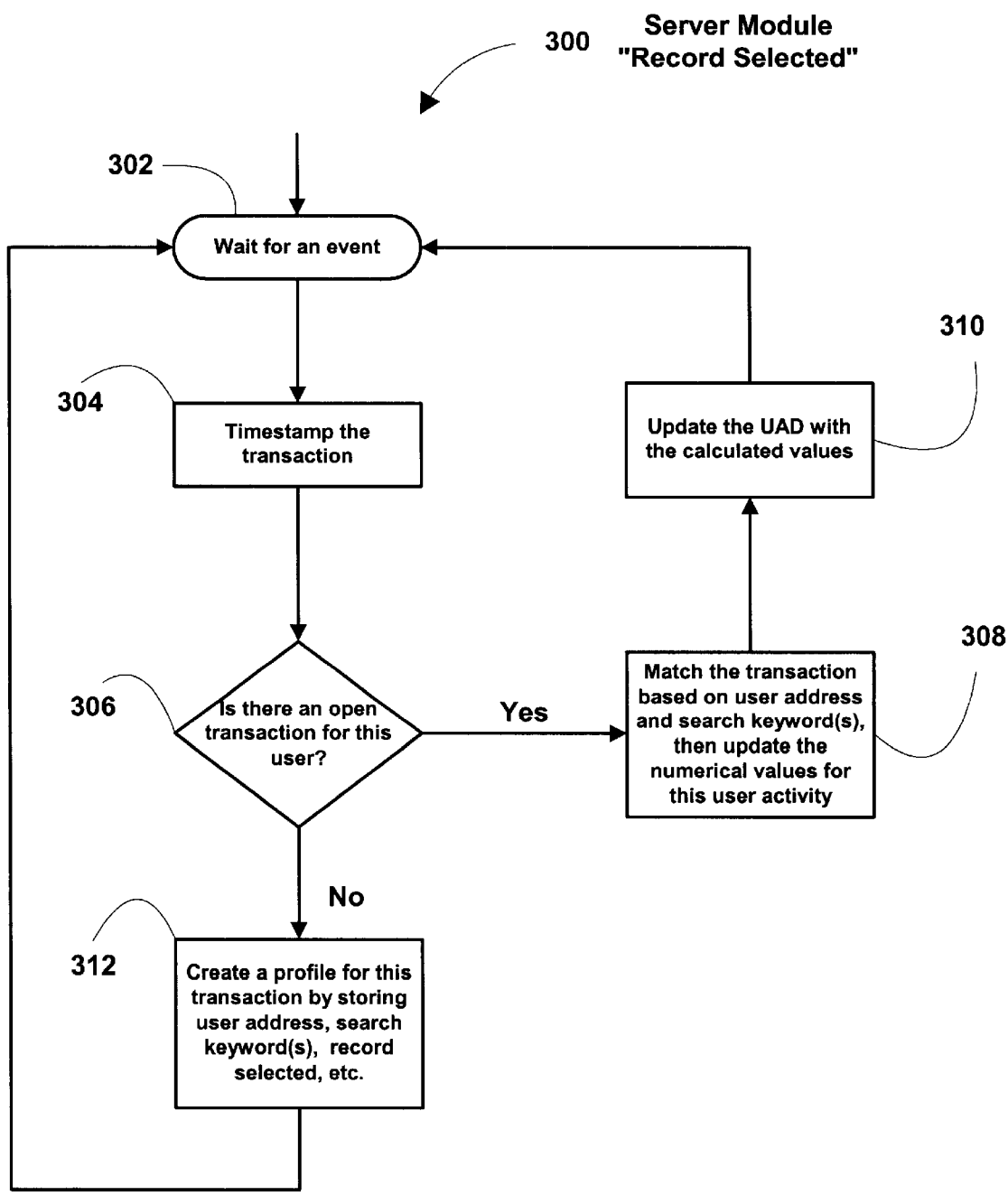
FIG. 3 is a block diagram of a another page module of a search engine of the present invention.

Referring now to FIG. 3, a flowchart generally 300 is a server module called "Record Selected", which describes the basic steps for a program implemented in a digital processing unit for the purpose of processing the event that a certain user has selected a certain record from a displayed list of records. This is an event driven module, 302 waits for an event to happen, i.e. a packet to show up in the queue, before this module is executed. The arrival of a new packet will create an event that will trigger this module. The first step in the execution is 304 where the transaction is timestamped, so that subsequent time based calculations can be performed. In the next step 306 the module will try to determine if there is an open transaction that matches with this transaction. This is done in an effort to calculate Page 16 the elapsed time, so that a user activity can be assigned a numeric value. If the determination is true, then the program proceeds along a YES branch to 308. In step 308 the elapsed time between transactions is calculated. Contingent upon the elapsed time a weight is calculated. In step 310 the keyword-record count is incremented, and the keyword-record weight is updated. After step 310, step 302 is performed.

For step 306, the determination is false, then the routine proceeds along a NO branch to 312. In step 312 a transaction is opened, pertinent data such as user address, search keywords, records shown, etc. are stored, so it would be easier to perform subsequent calculations. After step 312 step 302 is performed.

Figure 4:
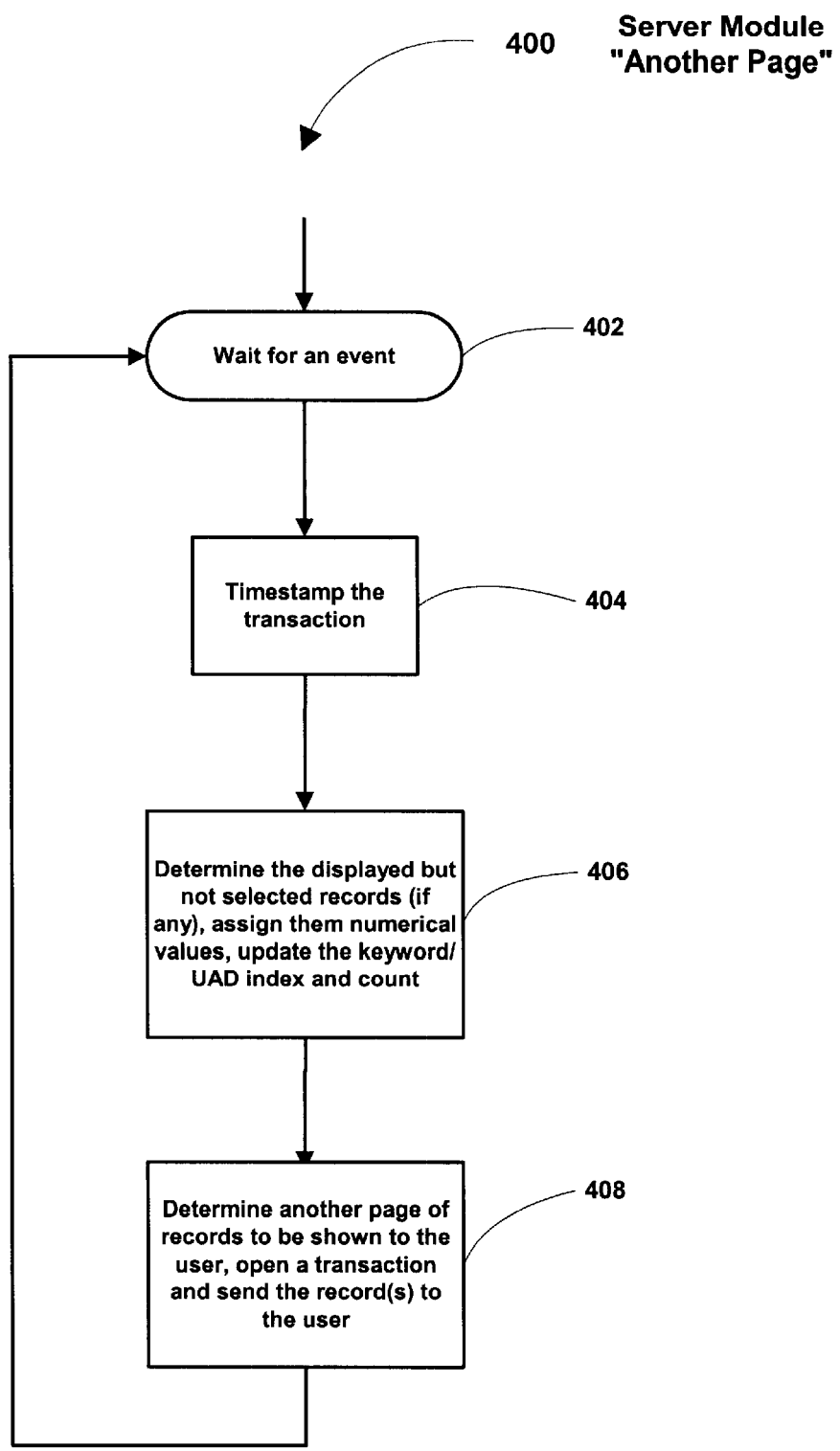
FIG. 4 is a block diagram of a record selected module of a search engine of the present invention.

Referring now to FIG. 4, a flowchart generally 400 is a server module called "Another Page", which describes the basic steps for a program implemented in a digital processing unit for the purpose of processing the event that a certain user has requested another set of records—page—of records. This is an event driven module, 402 waits for an event to happen, i.e. a packet to show up in the queue, before this module is executed. The arrival of a new packet will create an event that will trigger this module. The first step in the execution is 404 where the transaction is timestamped, so that subsequent time based calculations can be performed. In the next step 406 the module will try to determine the records that were displayed but not selected by the user, so that these records can be assigned a negative weight (because the user ignored these records which implies the records were not relevant), the transaction count will be incremented. In the next step 408 the module will try to determine the records—page—that are requested by the user. A transaction is opened for this activity, which will comprise of user address, keyword(s) and it is timestamped. After step 408 step 402 is performed.

Figure 5:
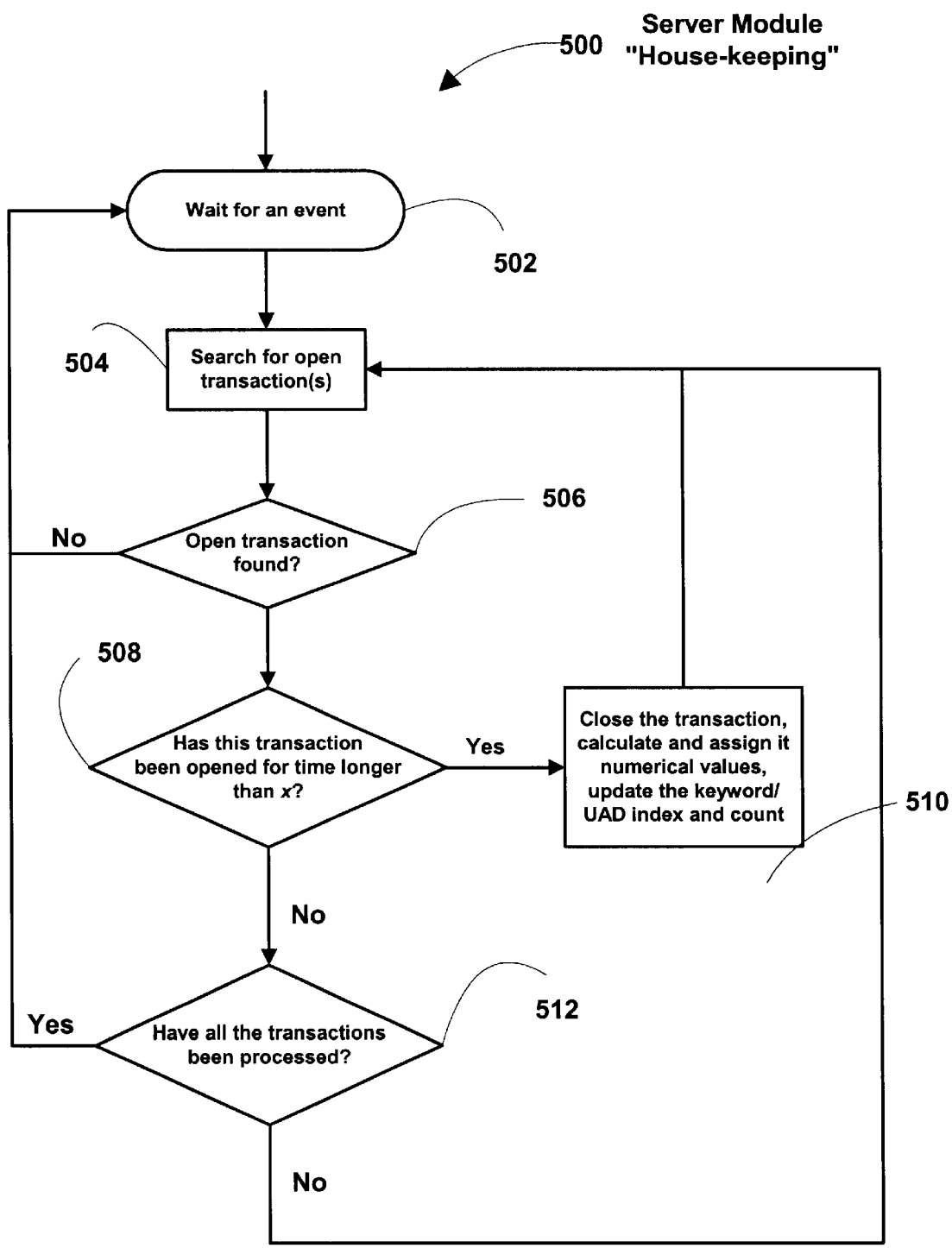
FIG. 5 is a block diagram of a housing-keeping module of a search engine of the present invention.

Referring now to FIG. 5, a flowchart generally 500 is a server module called "House-keeping", which describes the basic steps for a program implemented in a digital processing unit for the purpose of processing the event that system has decided to do house-keeping, i.e. close transactions that have expired (been open for too long). This is an event driven module, 502 waits for an event to happen, i.e. a packet to show up in the queue, before this module is executed. The arrival of a new packet will create an event that will trigger this module. The first step in the execution is 504 where an open transaction is searched. In the next step 506 the module will try to determine if any open transaction was found or not. If the determination is false, then the program proceeds along a NO branch to 502 where it will process a new request. If the determination is true, then the program proceeds along a YES branch to step 508 where it will try to determine if the transaction has been open for longer than a predetermined period. If the determination is true, then the program proceeds along a YES branch to step 510 where it will close the open transaction, and update the UAD. Next step will be to transfer control to step 504. If for step 508 the determination is false, then the program proceeds along a NO branch to step 512 where it will try to determine if all of the transactions have been processed. If the determination is true, then the program proceeds along a YES branch to step 502 where it will process a new packet. If the determination is false, then the program proceeds along a NO branch to step 504 where it will search for another open transaction.

Figure 6:
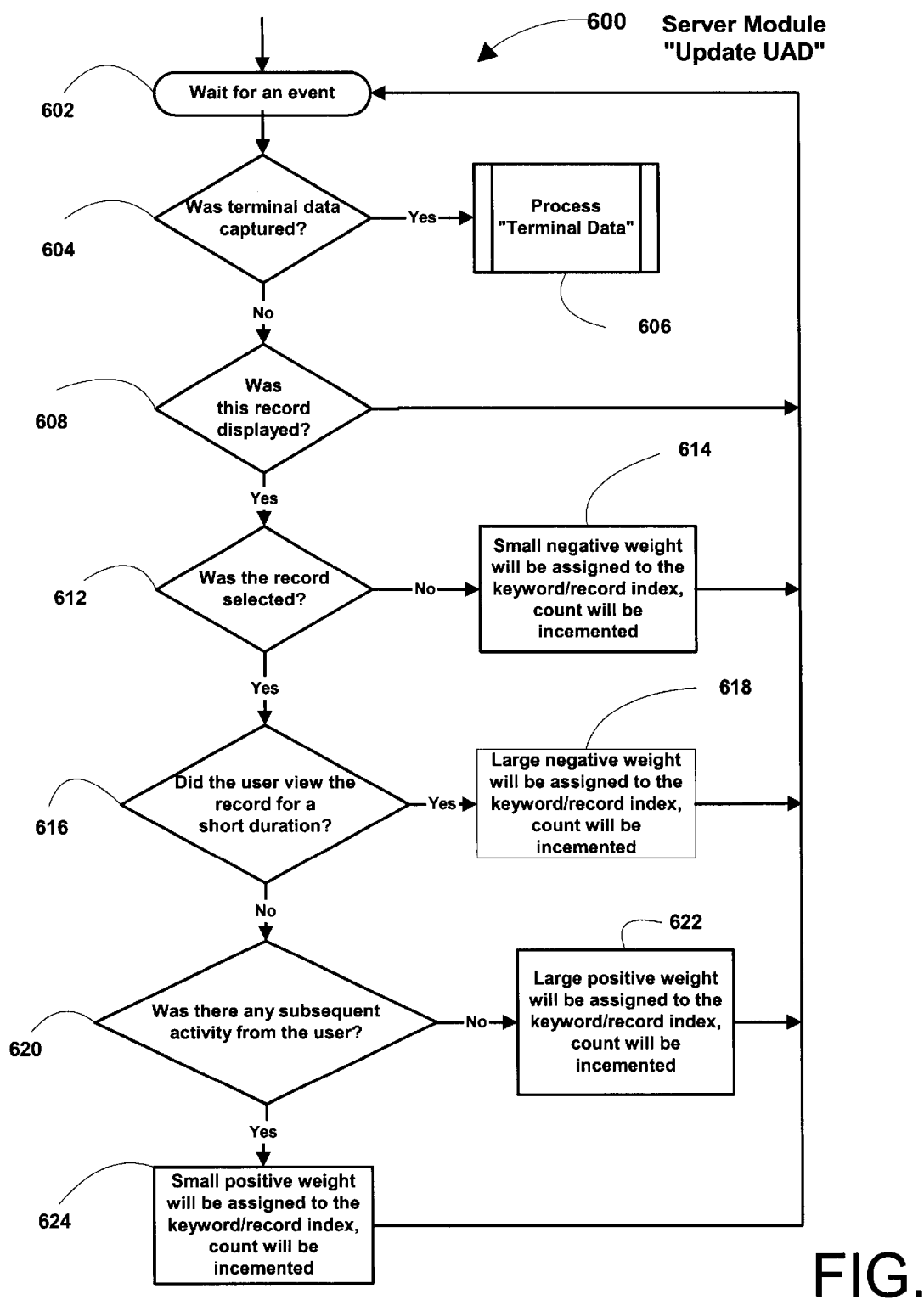
FIG. 6 is a block diagram of a update UAD module of a search engine of the present invention.

Referring now to FIG. 6, a flowchart generally 600 is a server module called "Update UAD", which describes the basic steps for a program implemented in a digital processing unit for the purpose of updating the weights and counts based on UAD. This is an event driven module, 602 waits for an event to happen, i.e. a packet to show up in the queue, before this module is executed. The arrival of a new packet will create an event that will trigger this module. The first step in the execution is 604 where the module will try to determine if this packet is terminal data or not. If the determination is true, then the program proceeds along a YES branch to step 606 where an external routine "Terminal Data" is called to process this packet. If the determination is false, i.e. it is not terminal data, then the program proceeds along a NO branch to 608 where it will try to determine if this record was displayed or not. If the determination is false, i.e. the record was not displayed, then the program proceeds along a NO branch to 602 where it will process a new packet. If the determination is true, then the program proceeds along a YES branch to step 612 where it will try to determine if the record was selected by the user or not. If the determination is false, i.e. the record was not selected, then the program proceeds along a NO branch to 614 where it will update the UAD, a small negative value will be assigned to the weight, and the counter will be incremented. The next step will be 602 where it will process a new packet. At step 612 if the determination is true, then the program proceeds along a YES branch to step 616 where it will try to determine if the user viewed the packet for a short duration or not. If the determination is true, then the program proceeds along a YES branch to 618 where it will update the UAD, a large negative value will be assigned to the weight, and the counter will be incremented. The next step will be 602 where it will process a new packet. At step 616 if the determination is false, then the program proceeds along a NO branch to 620. At step 620 the module will try determine if there were any subsequent user activity. If the determination is false, i.e. there was no subsequent user activity, then the program proceeds along a NO branch to 622 where it will update the UAD, a large positive value will be assigned to the weight, and the counter will be incremented. The next step will be 602 where it will process a new packet. At step 620 if the determination is true, then the program proceeds along a YES branch to step 624 where a small positive value will be assigned to the weight, and the counter will be incremented. The next step will be 602 where it will process a new packet.

Figure 7:
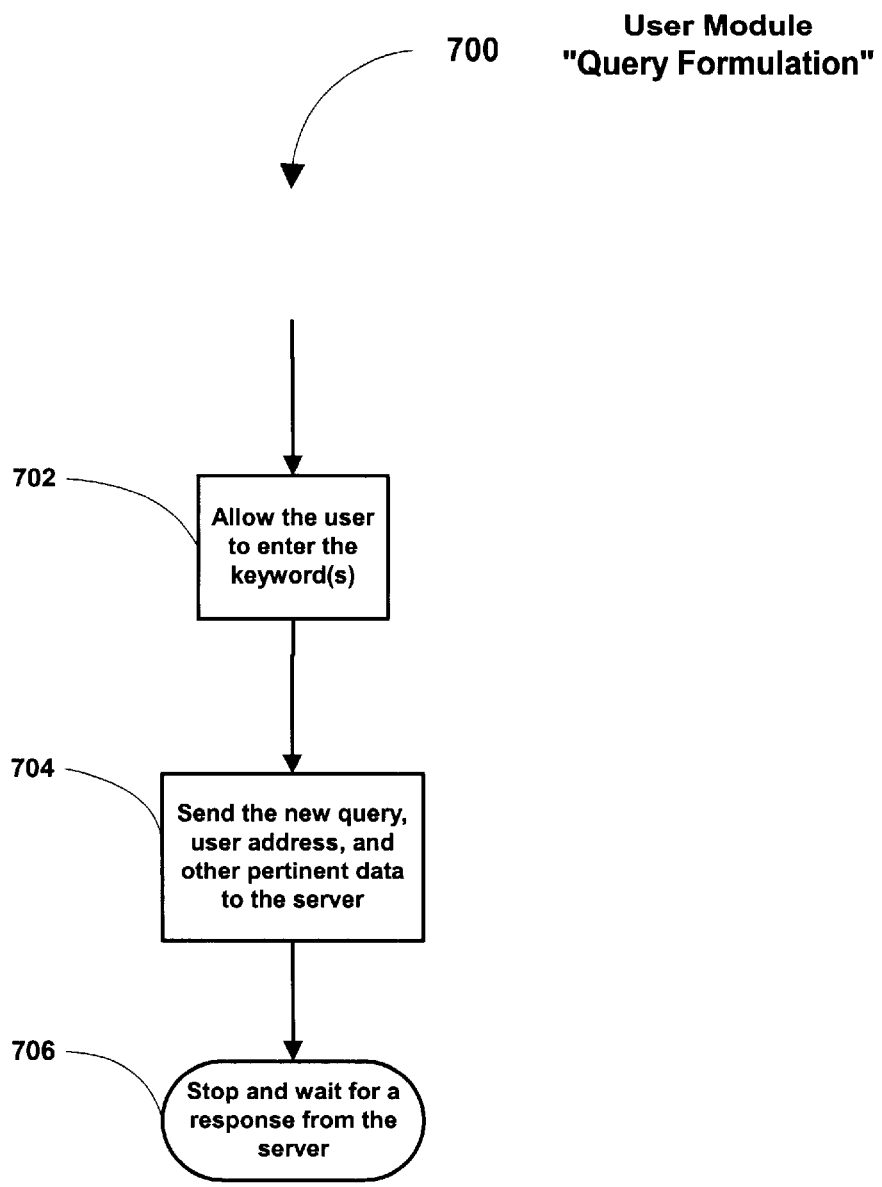
FIG. 7 is a block diagram of a query formulation module of a search engine of the present invention.

Referring now to FIG. 7, a flowchart generally 700 is a user module called "Query Formulation", which describes the basic steps for a program implemented in a digital processing unit for the purpose of allowing an end user to create a query based on keyword(s) and/or keyword(s) and Boolean operator(s). In step 702 a user enters the desired query and submits it. In step 704 the user-interface supplements the query with additional data such as the user address (user address can be based on IP address, or CPU serial number, or a combination of the two, etc.). Once the query packet has been sent to the server, the user-interface will stop 706 and wait for a response from the server.

Figure 8:
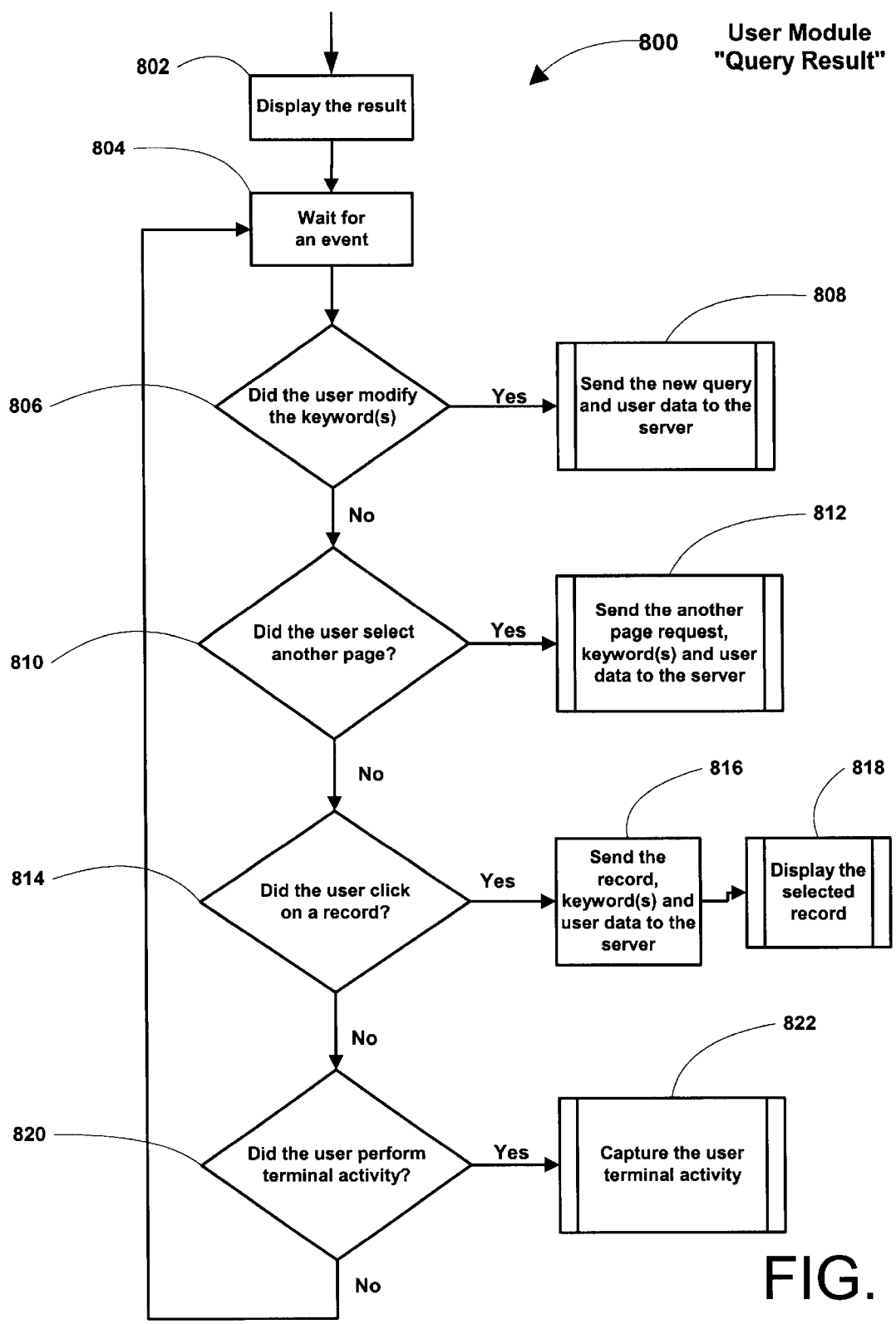
FIG. 8 is a block diagram of a query results module of a search engine of the present invention.

Referring now to FIG. 8, a flowchart generally 800 is a user module called "Query Result", which describes the basic steps for a program implemented in a digital processing unit for the purpose of displaying the result of a user query and processing user activity. This is an event driven module, step 802 waits for a response back from the server, step 804 waits for a user event to happen, i.e. the user to perform some activity, before this module is executed. Any user activity will trigger this module. The first step in the execution is 806 where the module will try to determine if the user has modified the keywords or not, i.e. the user has changed his mind about the query keywords. If the determination is true, then the program proceeds along a YES branch to step 808 where an external routine "Send Query to Server" is called. If the determination is false, i.e. the user did not execute a new query, then the program proceeds along a NO branch to 810 where it will try to determine if the user selected another page or not. If the determination is true, then the program proceeds along a YES branch to step 812 where it will send a "Another Page" request and user data to the server. If the determination is false, i.e. another page was not requested, then the program proceeds along a NO branch to 814 where it will determine if the user selected a record or not. If the determination is true, then the program proceeds along a YES branch to step 816 where it will send the selected record and user data to the server. In step 818, a call to an external routine will be performed where the selected record is displayed. If the determination is false, i.e. the user did not select a record, then the program proceeds along a NO branch to 820 where it will determine if any terminal activity (print, cut/copy/paste, bookmark, etc.) was performed. At step 820 if the determination is true, then the program proceeds along a YES branch to step 822 where it will capture the user terminal activity. If the determination is false, i.e. the user did not perform any terminal activity, then the program proceeds along a NO branch to 802 where it will process a new user activity.

Figure 9:
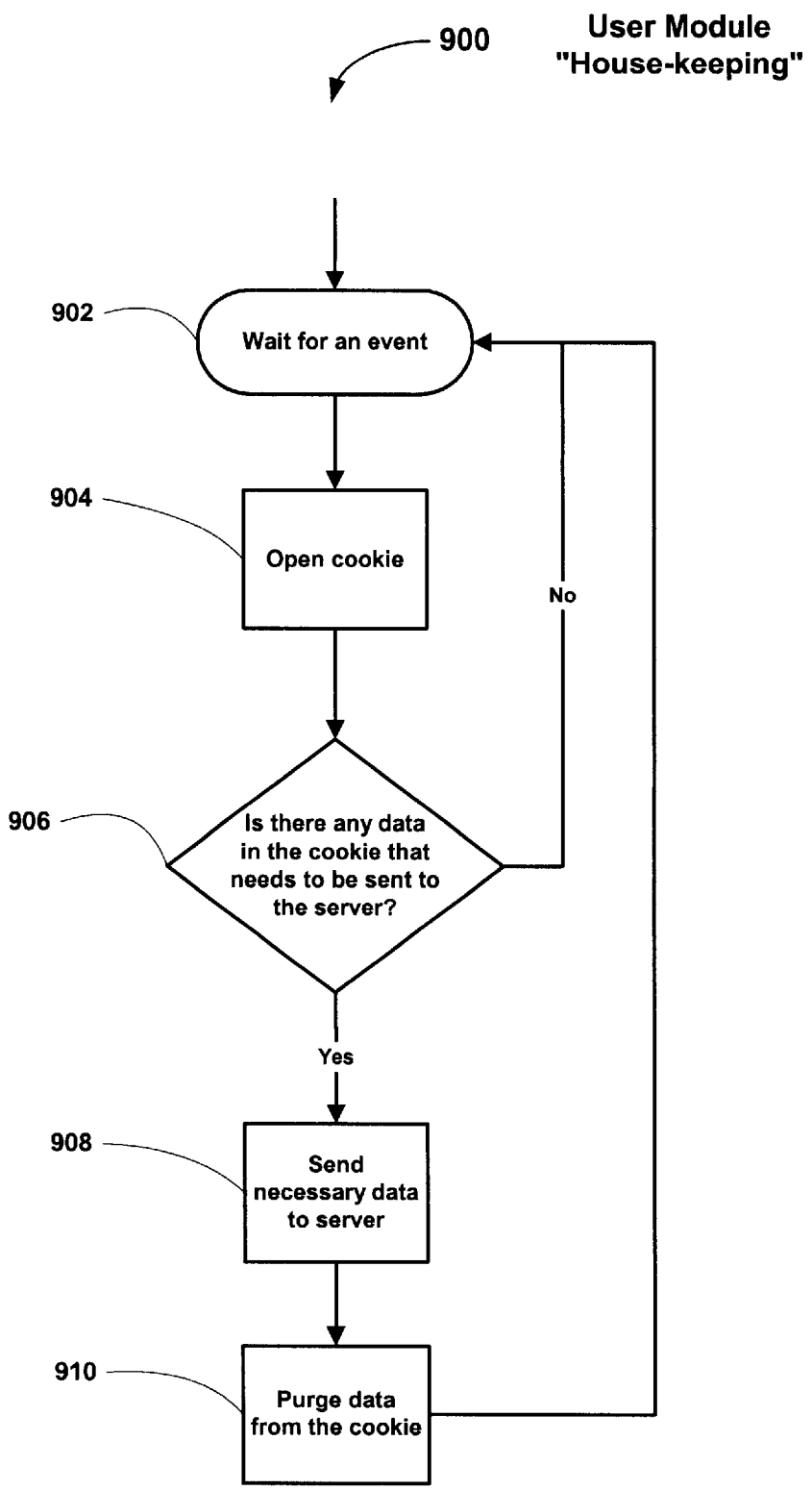
FIG. 9 is a block diagram of a second house-keeping module of a search engine of the present invention.

Referring now to FIG. 9, a flowchart generally 900 is a user module called "House Keeping", which describes the basic steps for a program implemented in a digital processing unit for the purpose of processing data that has been captured by a cookie. Typically this will be the user terminal activity data. This is an event driven module, step 902 waits for an event to happen, i.e. a timer or when the CPU is idle, before this module is executed. The first step in the execution is 904 where the module will open a cookie. In step 906 the module will try to determine if any terminal data was stored in the cookie or not. If the determination is true, i.e. there was terminal data was stored in the cookie, then the program proceeds along a YES branch to step 908 where the necessary data is sent to the server. In step 910 the terminal data is purged from the cookie since it has been already sent to the server. Next step 902 will be performed. If for step 906 the determination is false, i.e. there was no terminal data in the cookie, then the program proceeds along a NO branch to 902 where it will process a another house-keeping event.

Figure 10:
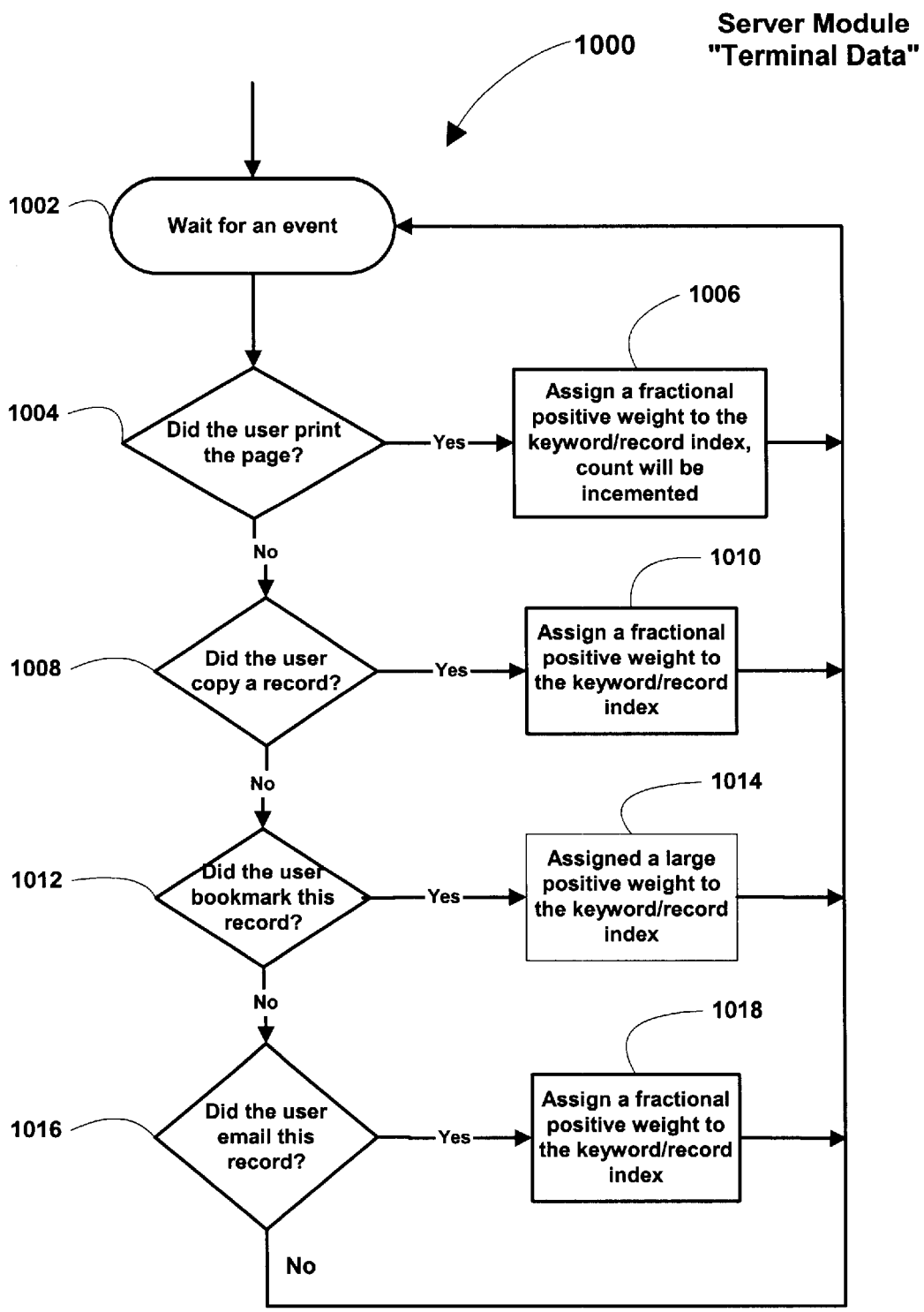
FIG. 10 is a block diagram of a terminal data module of a search engine of the present invention.

Referring now to FIG. 10, a flowchart generally 1000 is a system module called "Terminal Data", which describes the basic steps for a program implemented in a digital processing unit for the purpose of processing terminal activity data. This is an event driven module, step 1002 waits for an event to happen, before this module is executed. The first step in the execution is 1004 where the module will try to determine if the user printed a record or the page or not. If the determination is true, i.e. the user did print a record or the page, then the program proceeds along a YES branch to step 1006, where for all of the records on the page a small positive weight is added to the keyword-record index and the activity counter is incremented. Next step 1002 is processed. If for step 1004 the determination is false, i.e. the user did not print a record or the page, then the program proceeds along a NO branch to 1008 where it will try to determine if the user copied a record or not. If the determination is true, i.e. the user did copy at least one record, then the program proceeds along a YES branch to step 1010, where a small positive weight is added to the keyword-record index and the activity counter is incremented. Next step 1002 is processed. If for step 1008 the determination is false, i.e. the user did not copy a record, then the program proceeds along a NO branch to 1012 where it will try to determine if the user bookmarked a record or not. If the determination is true, i.e. the user did bookmark a record, then the program proceeds along a YES branch to step 1014, where a large positive weight is added to the keyword-record index and the activity counter is incremented. Next step 1002 is processed. If for step 1012 the determination is false, i.e. the user did not bookmark a record, then the program proceeds along a NO branch to 1016 where it will try to determine if the user emailed this record or not. If the determination is true, i.e. the user did email a record, then the program proceeds along a YES branch to step 1018, where a small positive weight is added to the keyword-record index and the activity counter is incremented. Next step 1002 is processed. If for step 1016 the determination is false, i.e. the user did not email a record, then the program proceeds along a NO branch to 1002 where it will process another "Terminal Data" event.

Figure 11:
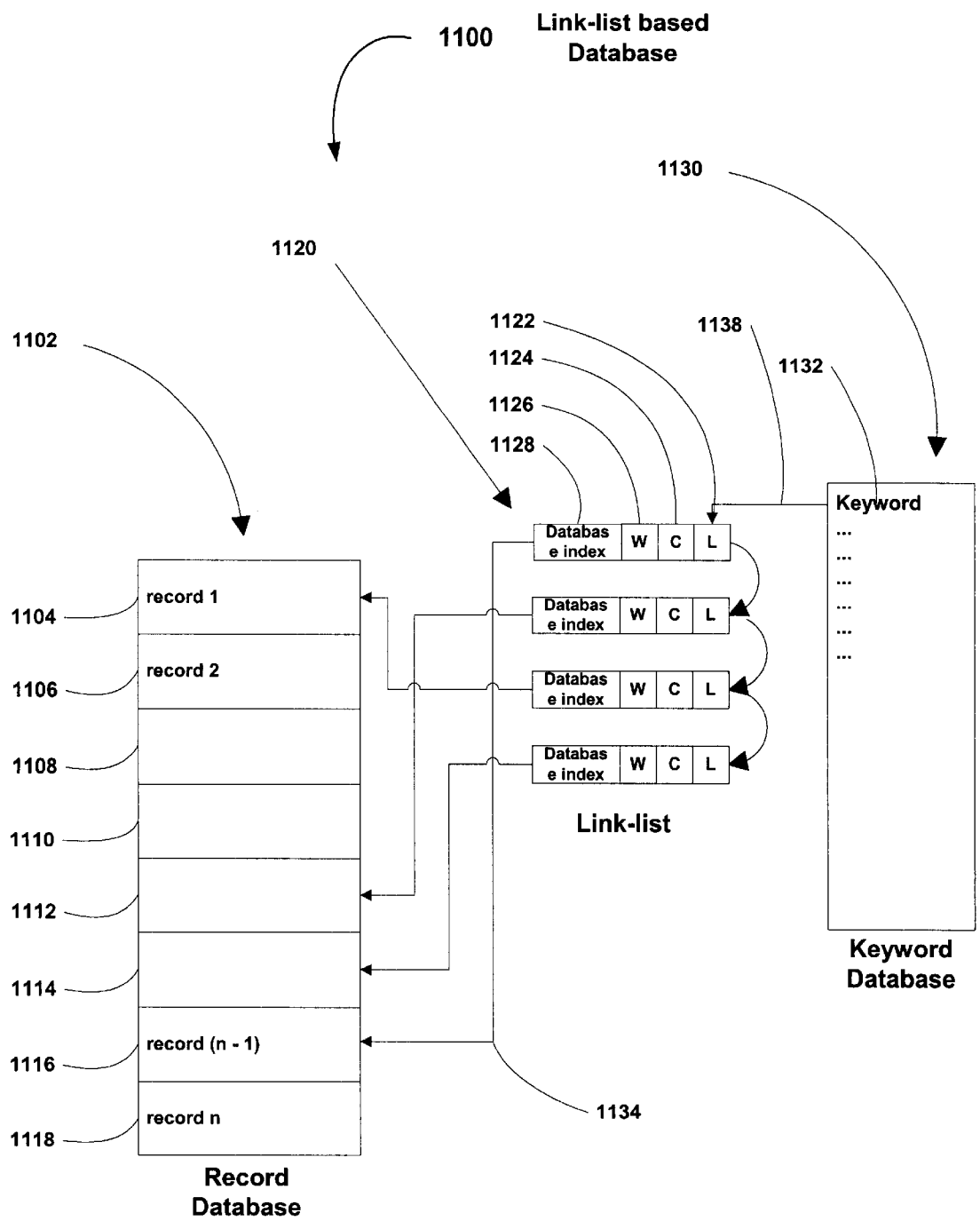
FIG. 11 is a block diagram of a link-list based database of a search engine of the present invention.

Referring now to FIG. 11, generally 1100 which describes a link-list based database implemented in a digital processing unit for the purpose of storing and retrieving records. 1102 is a Record Database, it contains all of the necessary records. 1104 is a record in the Record Database 1102, from 1106 to 1118 are records in the Record Database 1102. 1130 is a Keyword Database, 1132 is a keyword in the Keyword Database 1130. 1120 is a link-list that ties a keyword in the Keyword Database 1130 with the records that contain that keyword in the Record Database 1102. 1138 is the link between the keyword 1132 and the link-list 1120. 1128 (in the link-list 1120) is the index of a record in the Record Database 1102 that contains the keyword 1132. 1126 is the weight associated with the keyword 1132 and the record 1116. 1124 is the count associated with the keyword 1132 and the record 1116. 1122 contains the address of the next link in the link-list. As new record(s) is added to the Record Database 1102, new link will be added to the link-list 1120, conversely as a record is deleted the link will be deleted. Of course, when new records are added, all associated database entries must be constructed.

Figure 12:
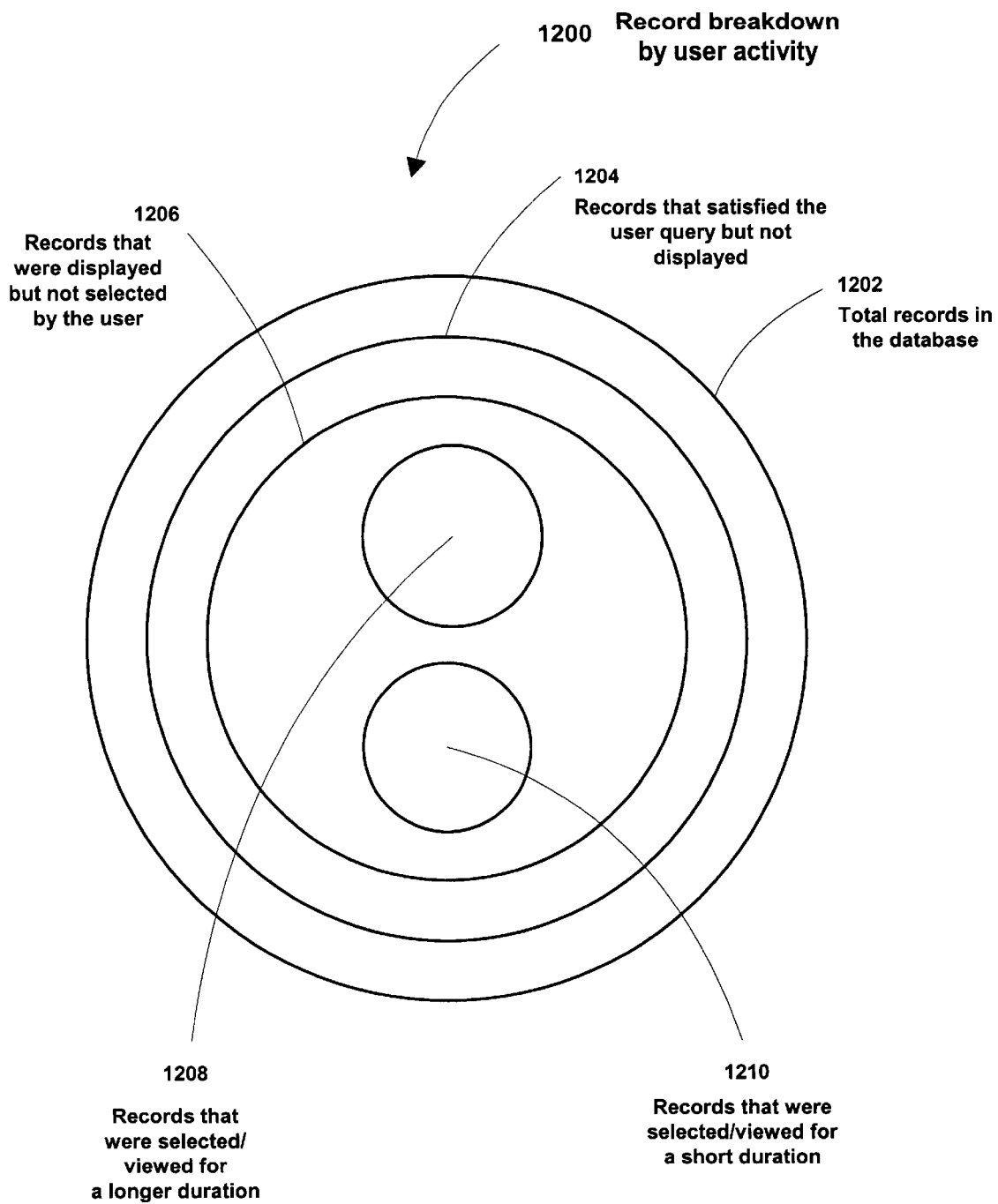
FIG. 12 is a diagram of a record breakdown by user activity of a search engine of the present invention.

Referring now to FIG. 12, generally 1200 which describes a record breakdown by user query and subsequent activity. 1202 is the total number of records in the database. 1204 is the total number of records that satisfy the user query. 1206 is the total number of records that were displayed but not selected. 1208 is the total number of records that were selected and viewed for a longer duration. 1210 is the total number of records that were selected and viewed for a shorter duration.

Figure 13:
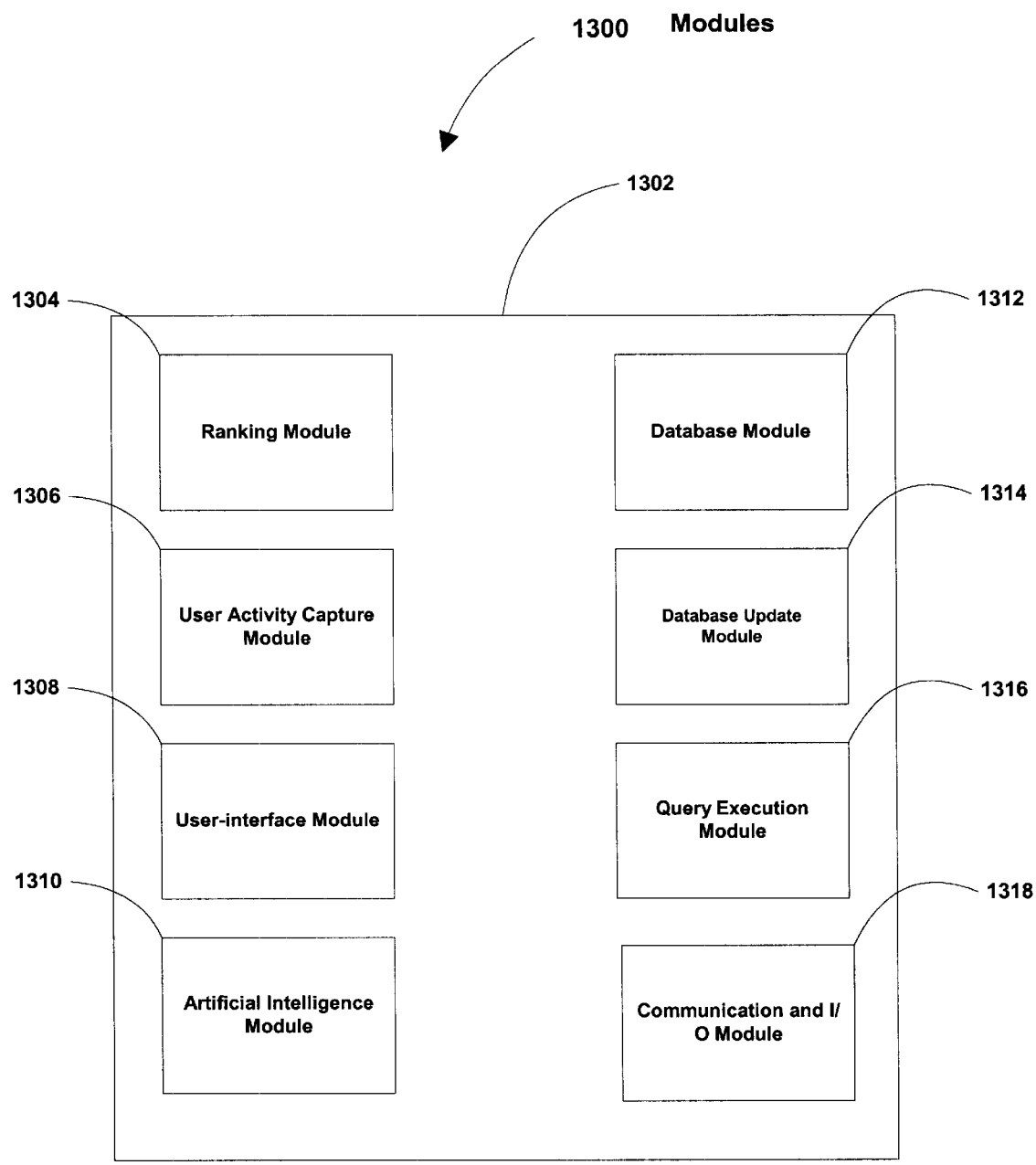
FIG. 13 is a block diagram of modules of a search engine of the present invention.

Referring now to FIG. 13, generally 1300 which describes the different modules of the system.

1304 is a Ranking Module, it ranks the records that satisfy a user query before the records are shown to the user. It is a server component.

1306 is a User Activity Capture Module, it captures the user activity and then sends it to the server. It is a client component.

1308 is a User Interface Module, it is the client interface, it allows the construction of query, capture of UAD and Terminal Data. It is a client component.

1310 is an Artificial Intelligence Module, it helps in determination of clusters, ranking of records, etc. It is a server component.

1312 is a Database Module, it contains the records, keywords, and UAD. It is a server component.

1314 is a Database Update Module, it updates the UAD. It is a server component.

1316 is a Query Execution Module, it processes and executes a query on the database. It is a server component.

1318 is a Communications and I/O Module, it allows the client and the server to communicate and read and write to the disk. It is both a client and a server component.

Figure 14:
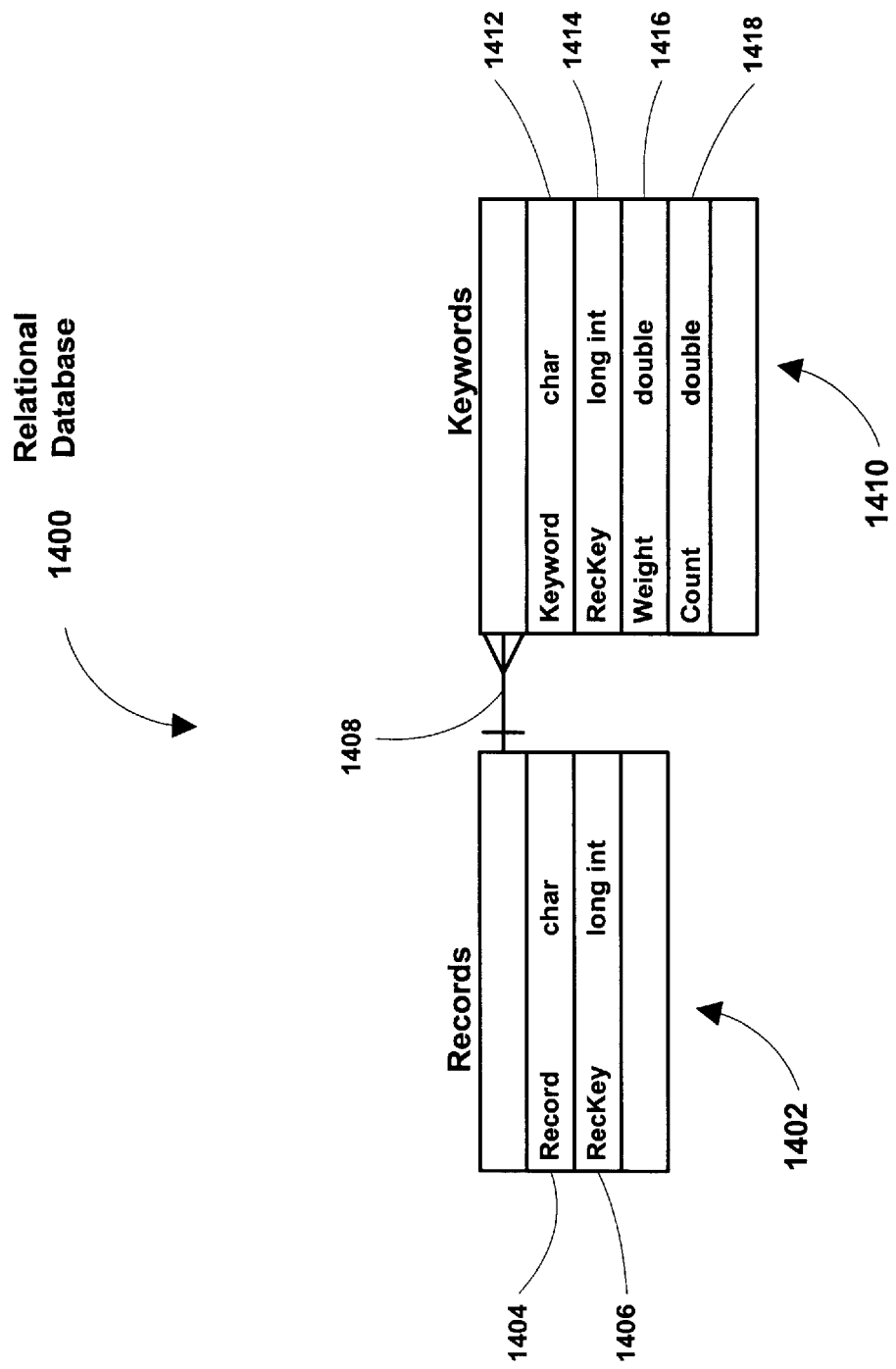
FIG. 14 is a block diagram of an preferred relational database containing UAD of a search engine of the present invention.

Referring now to FIG. 14, generally 1400 which describes a relational database schema implemented in a digital processing unit for the purpose of storing and retrieving records. 1402 is a Records table, it contains all of the necessary records. 1404 is a unique record in the Records table 1402, 1406 is a unique key that will tie it to other table(s). 1410 is a Keywords table, 1412 is a keyword in the Keywords table 1410, it is not unique. 1414 is a unique key that will tie it to other table(s). however, the combination of keyword 1412 and key 1414 is unique. 1416 will store the weight (negative or positive) for the keyword-record relation. 1418 will store the count, i.e. the number of times a user has performed some activity on this keyword-record relation. 1408 is a many-to-one relationship between the Keywords table 1410 and the Records table 1402, i.e., many keywords can point to one record.

Figure 15:
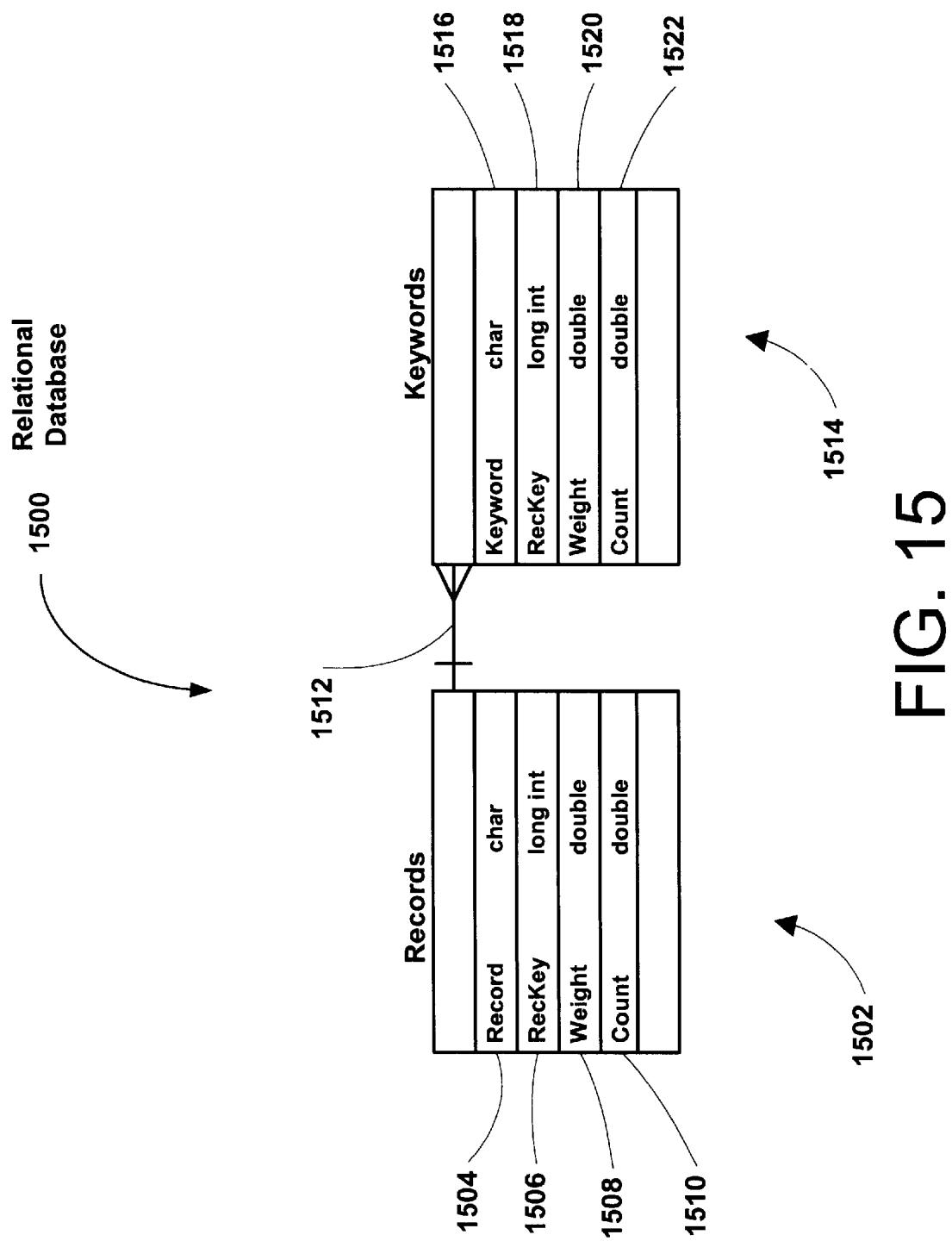
FIG. 15 is a block diagram of another preferred relational database containing UAD of a search engine of the present invention.

Referring now to FIG. 15, generally 1500 which describes a relational database schema implemented in a digital processing unit for the purpose of storing and retrieving records. 1502 is a Records table, it contains all of the necessary records and UAD assigned to them. 1504 is a unique record in the Records table 1502, 1506 is a unique key that will tie it to other table(s). 1508 is the weight assigned to this record, i.e. how this record was ranked cumulatively. 1510 is the count assigned to this record, i.e. how many times user activity was recorded for this record. 1514 is a Keywords table, 1516 is a keyword in the Keywords table 1514, it is not unique. 1518 is a unique key that will tie it to other table(s). However, the combination of keyword 1516 and key 1518 is unique. 1520 will store the weight (negative or positive) for the keyword-record relation. 1522 will store the count, i.e. the number of times a user has performed some activity on this keyword-record relation. 1512 is a many-to-one relationship between the Keywords table 1514 and the Records table 1502, i.e. many keywords can point to one record.

Although the invention has been disclosed with reference to its preferred embodiments, from reading this description those of skill in the art may appreciate changes and modification that may be made which do not depart from the scope and spirit of the invention as described above and claimed hereafter. All of these references are incorporated herein by reference.

I claim:

1. A search engine implemented on a distributed network comprising:

a. a user interface or a graphics user interface;
b. a packet processing module that converts each packet to at least one transaction and processes the transaction;
c. a database including records, keywords, user activity data (UAD), and a UAD updating routine for updating UAD;
d. a ranking protocol including record specific data (RSD) and UAD for ranking retrieved records from the records database;
e. communication and I/O,
where the ranking protocol comprises:

$$r = \sum_i \alpha_i w_i^{pi} + \sum_{i,i'} \beta_{i,i'} \cdot (w_i \cdot w_{i'}) + \sum_j \alpha_j w_j^{pj} + \sum_{j,j'} \beta_{j,j'} \cdot (w_j \cdot w_{j'}) + \sum_{i,j} \gamma_{i,j} \cdot (w_i \cdot w_j) \quad (1)$$

where r is a ranking factor, $\alpha_i$ is a weight factor representing an amount of weight to be given to $w_i$ which is a value of an $i^{th}$ record specific criterion, $p_i$ is a power factor of the $i^{th}$ record specific criterion and i is an integer ranging over the record specific criterion and $\alpha_j$ is a weight factor representing an amount of weight to be given to $w_j$ which is a value a $j^{th}$ user activity criterion, $p_j$ is a power factor of the $j^{th}$ user activity criterion and j is an integer ranging over the user activity criterion.

2. The search engine of claim 1, wherein the database module further includes:
   records, keywords, and a UAD updating routine for updating UAD.

3. The search engine of claim 1, wherein the database module further includes:
   at least one records database;
   a keywords database including user activity data (UAD); and
   a UAD updating routine for updating UAD.

4. The engine of claims 1, further comprising a query refinement module for identifying clustering of records based on UAD and RSD so that user queries can have improved relevance and context and artificial intelligence module for refining the ranking protocol, determining clustering, and UAD updating.

5. A search engine component comprising:
a. a packet processing module that converts each packet to at least one transaction and processes the transaction;
b. a database including user activity data (UAD); and
c. a ranking protocol including record specific data (RSD) and UAD for ranking retrieved records from the records database, where the ranking protocol comprises:

$$r = \sum_i \alpha_i w_i^{pi} + \sum_{i,i'} \beta_{i,i'} \cdot (w_i \cdot w_{i'}) + \sum_j \alpha_j w_j^{pj} + \sum_{j,j'} \beta_{j,j'} \cdot (w_j \cdot w_{j'}) + \sum_{i,j} \gamma_{i,j} \cdot (w_i \cdot w_j) \quad (1)$$

where r is a ranking factor, $\alpha_i$ is a weight factor representing an amount of weight to be given to $w_i$ which is a value of an $i^{th}$ record specific criterion, $p_i$ is a power factor of the $i^{th}$ record specific criterion and i is an integer ranging over the record specific criterion and $\alpha_j$ is a weight factor representing an amount of weight to be given to $w_j$ which is a value a $j^{th}$ user activity criterion, $p_j$ is a power factor of the $j^{th}$ user activity criterion and j is an integer ranging over the user activity criterion.

6. The component of claim 5, wherein the database module further includes:
   records, keywords, and a UAD updating routine for updating UAD.

7. The component of claim 5, wherein the database module further includes:
   at least one records database;
   a keywords database including user activity data (UAD); and
   a UAD updating routine for updating UAD.

8. The component of claim 7, wherein the transaction processing module for processing transactions includes:
   a new query processing routine for retrieving records satisfying the query and ranking the retrieved records according to the ranking protocol;
   a selected record processing routine including a first UAD activity value and a count incrementer,
   a record range processing routine including a second UAD activity value and the count incrementer for identifying retrieved records viewed by a user;
   a terminal activity processing routine including a third UAD activity value and the count incrementer.

9. The component of claim 5, further comprising a query refinement module for identifying clustering of records based on UAD and RSD so that user queries can have improved relevance and context and artificial intelligence module for refining the ranking protocol, determining clustering, and UAD updating.

10. A ranking protocol implemented in a digital processing unit comprising:

$$r = \sum_i \alpha_i w_i^{pi} + \sum_{i,i'} \beta_{i,i'} \cdot (w_i \cdot w_{i'}) + \sum_j \alpha_j w_j^{pj} + \sum_{j,j'} \beta_{j,j'} \cdot (w_j \cdot w_{j'}) + \sum_{i,j} \gamma_{i,j} \cdot (w_i \cdot w_j) \quad (1)$$

where r is a ranking factor, $\alpha_i$ is a weight factor representing an amount of weight to be given to $w_i$ which is a value of an $i^{th}$ record specific criterion, $p_i$ is a power factor of the $i^{th}$ record specific criterion and i is an integer ranging over the record specific criterion and $\alpha_j$ is a weight factor representing an amount of weight to be given to $w_j$ which is a value a $j^{th}$ user activity criterion, $p_j$ is a power factor of the $j^{th}$ user activity criterion and j is an integer ranging over the user activity criterion.

* * * * *